(12) United States Patent
Milligan et al.

(10) Patent No.: US 12,283,161 B2
(45) Date of Patent: Apr. 22, 2025

(54) GAMING SYSTEMS WITH CONFIGURABLE JACKPOT AWARD STRATEGIES

(71) Applicant: Video Gaming Technologies, Inc., Franklin, TN (US)

(72) Inventors: Daniel William Milligan, Palmyra, VA (US); Christopher John Thacker, Earlysville, VA (US); Stephen Wade Brooks, Johnston, IA (US); Jason Todd Sprinkle, Pauline, SC (US)

(73) Assignee: Video Gaming Technologies, Inc., Franklin, TN (US)

( * ) Notice: Subject to any disclaimer, the term of this patent is extended or adjusted under 35 U.S.C. 154(b) by 0 days.

(21) Appl. No.: 18/464,103

(22) Filed: Sep. 8, 2023

(65) Prior Publication Data

US 2023/0419784 A1 Dec. 28, 2023

Related U.S. Application Data

(63) Continuation of application No. 17/118,193, filed on Dec. 10, 2020, now Pat. No. 11,790,726, which is a continuation of application No. 16/151,815, filed on Oct. 4, 2018, now Pat. No. 10,872,496, which is a continuation of application No. 15/259,795, filed on (Continued)

(51) Int. Cl.
| | |
|---|---|
| G07F 17/32 | (2006.01) |
| A63F 9/24 | (2006.01) |
| A63F 13/00 | (2014.01) |
| G07F 17/34 | (2006.01) |

(52) U.S. Cl.
CPC ............ *G07F 17/3258* (2013.01); *A63F 9/24* (2013.01); *A63F 13/00* (2013.01); *G07F 17/32* (2013.01); *G07F 17/3209* (2013.01); *G07F 17/3211* (2013.01); *G07F 17/3225* (2013.01); *G07F 17/3246* (2013.01); *G07F 17/3248* (2013.01); *G07F 17/3272* (2013.01); *G07F 17/34* (2013.01)

(58) Field of Classification Search
None
See application file for complete search history.

(56) References Cited

U.S. PATENT DOCUMENTS

| | | |
|---|---|---|
| 5,851,010 A | 12/1998 | Feinberg |
| 6,312,332 B1 | 11/2001 | Walker |

(Continued)

OTHER PUBLICATIONS

Office Action dated Mar. 13, 2020, for U.S. Appl. No. 16/151,815 (pp. 1-16).

(Continued)

*Primary Examiner* — Damon J Pierce
(74) *Attorney, Agent, or Firm* — Armstrong Teasdale LLP

(57) ABSTRACT

A gaming machine includes an input device and a processor coupled to the input device. The input device is configured to receive a game play event from a player. The processor is programmed to determine whether a jackpot trigger condition is satisfied based at least in part on the game play event. The jackpot trigger condition includes a target quantity of games played, a target set of game tokens, a target pattern of game symbols, and/or a target pattern of game play outcomes. The processor is further programmed to award a jackpot credit to one or more players when the jackpot trigger condition is satisfied.

20 Claims, 5 Drawing Sheets

Related U.S. Application Data

Sep. 8, 2016, now Pat. No. 10,304,288, which is a continuation of application No. 13/428,533, filed on Mar. 23, 2012, now Pat. No. 9,454,878.

(56) References Cited

U.S. PATENT DOCUMENTS

| | | | |
|---|---|---|---|
| 7,862,427 | B2 | 1/2011 | Nguyen |
| 7,934,984 | B2 | 5/2011 | Jensen |
| 8,070,597 | B2 | 12/2011 | Cuddy |
| 2004/0048646 | A1 | 3/2004 | Martin |
| 2004/0204235 | A1 | 10/2004 | Walker |
| 2005/0054430 | A1 | 3/2005 | Pitman |
| 2005/0215314 | A1 | 9/2005 | Schneider |
| 2006/0084495 | A1 | 4/2006 | Jaffe |
| 2008/0026834 | A1 | 1/2008 | Yoshizawa |
| 2008/0026835 | A1 | 1/2008 | Yoshizawa |
| 2009/0117979 | A1 | 5/2009 | Decasa, Jr. |
| 2009/0124327 | A1 | 5/2009 | Caputo |
| 2009/0124364 | A1* | 5/2009 | Cuddy .................... G07F 17/32 463/31 |
| 2009/0191956 | A1 | 7/2009 | Lyons |
| 2009/0233708 | A1 | 9/2009 | Kato |
| 2010/0041464 | A1 | 2/2010 | Arezina |
| 2010/0113131 | A1 | 5/2010 | Aoki |
| 2010/0210342 | A1 | 8/2010 | Pollack |
| 2011/0021260 | A1 | 1/2011 | Adiraju |
| 2011/0065512 | A1 | 3/2011 | Munakata |
| 2011/0086690 | A1 | 4/2011 | Acres |
| 2011/0092276 | A1 | 4/2011 | Acres |
| 2011/0098103 | A1 | 4/2011 | Munakata |
| 2011/0207525 | A1 | 8/2011 | Allen |
| 2013/0225254 | A1 | 8/2013 | Pececnik |

OTHER PUBLICATIONS

Notice of Allowance dated Aug. 20, 2020 for U.S. Appl. No. 16/151,815 (pp. 1-5).

Office Action (Non-Final Rejection) dated Apr. 14, 2022 for U.S. Appl. No. 17/118,193 (pp. 1-13).

Office Action (Final Rejection) dated Sep. 27, 2022 for U.S. Appl. No. 17/118,193 (pp. 1-15).

Office Action (Non-Final Rejection) dated Jan. 20, 2023 for U.S. Appl. No. 17/118,193 (pp. 1-7).

Office Action (Notice of Allowance and Fees Due (PTOL-85)) dated Jun. 7, 2023 for U.S. Appl. No. 17/118,193 (pp. 1-7).

* cited by examiner

GAMING SYSTEMS WITH CONFIGURABLE JACKPOT AWARD STRATEGIES

CROSS-REFERENCE TO RELATED APPLICATIONS

The present application is a continuation of pending U.S. application Ser. No. 17/118,193, filed Dec. 10, 2020, which is a continuation of U.S. application Ser. No. 16/151,815, filed Oct. 4, 2018, which issued as U.S. Pat. No. 10,872,496, which is a continuation of U.S. application Ser. No. 15/259,795, filed Sep. 8, 2016, which issued as U.S. Pat. No. 10,304,288, which is a continuation of U.S. application Ser. No. 13/428,533, filed Mar. 23, 2012, which issued as U.S. Pat. No. 9,454,878, all of which are hereby incorporated by reference in their entireties.

BACKGROUND OF THE INVENTION

The embodiments described herein relate generally to gaming machines and, more particularly, to systems and methods for awarding a jackpot to a player associated with a gaming machine.

At least some known gaming systems allocate a portion of a game play credit to a jackpot and award the jackpot to that player or another player (e.g., associated with another gaming machine) when a jackpot trigger condition is satisfied. For example, the jackpot trigger condition may include a total quantity of credits entered, or "coin-in."

The use of such jackpot trigger conditions may be limiting to the operator of a gaming system and, further, may be inadequate for motivating players to play a variety of games, such as a plurality of games provided by the same supplier and/or newly introduced games.

BRIEF DESCRIPTION OF THE INVENTION

In one aspect, a gaming system includes an input device and a processor coupled to the input device. The input device is configured to receive a game play event from a player. The processor is programmed to determine whether a jackpot trigger condition is satisfied based at least in part on the game play event. The jackpot trigger condition includes a target quantity of games played and/or a target set of game tokens. The processor is further programmed to award a jackpot credit to the player when the jackpot trigger condition is satisfied.

In another aspect, a method for use with a gaming system is provided. The method includes receiving, by at least one gaming server, a game play event associated with a player from a gaming machine. The at least one gaming server determines whether a jackpot trigger condition is satisfied based at least in part on the game play event. The jackpot trigger condition includes a target quantity of games played and/or a target set of game tokens. A jackpot credit is awarded to the player by the at least one gaming server when the jackpot trigger condition is satisfied.

In yet another aspect, a gaming system includes a plurality of gaming machines and a gaming server coupled in communication with the gaming machines. Each gaming machine is associated with a player and is configured to execute a game play based on a game play event received from the player to create a game play outcome, and to transmit game play information including the game play event and/or the game play outcome. The gaming server is configured to receive game play information from a first gaming machine of the gaming machines, and to determine whether a jackpot trigger condition is satisfied based at least in part on the game play information. The jackpot trigger condition includes a target quantity of games played, a target set of game tokens, a target pattern of game symbols, and/or a target pattern of game play outcomes. The gaming server is further configured to award at least a portion of a jackpot credit to a first player associated with the first gaming machine based at least in part on the jackpot trigger condition being satisfied.

DETAILED DESCRIPTION OF THE INVENTION

Exemplary embodiments of systems and methods for use in awarding a jackpot to one or more players associated with (e.g., playing a game of chance in) a gaming system are described herein. Such embodiments allow the operator of a gaming system to define configurable jackpot award strategies and provide an appealing, entertaining gaming experience to such players. Optionally, jackpots may be awarded in a group play context, such as by determining whether a jackpot trigger condition is satisfied based on game play events associated with a group of players, and distributing at least a portion of the jackpot to a plurality of players in the group.

Exemplary technical effects of systems and methods described herein include at least one of: (a) receive a game play event from a player; (b) executing a game play based on the game play event to create a game play outcome; (c) transmitting game play information including the game play event and/or the game play outcome; (d) receiving game play information; (e) determining whether a jackpot trigger condition is satisfied based at least in part on the game play information and/or the game play event, wherein the jackpot trigger condition includes a target quantity of games played, a target set of game tokens, a target pattern of game symbols, and/or a target pattern of game play outcomes; and (f) awarding at least a portion of a jackpot credit to the player when the jackpot trigger condition is satisfied.

Figure 1:
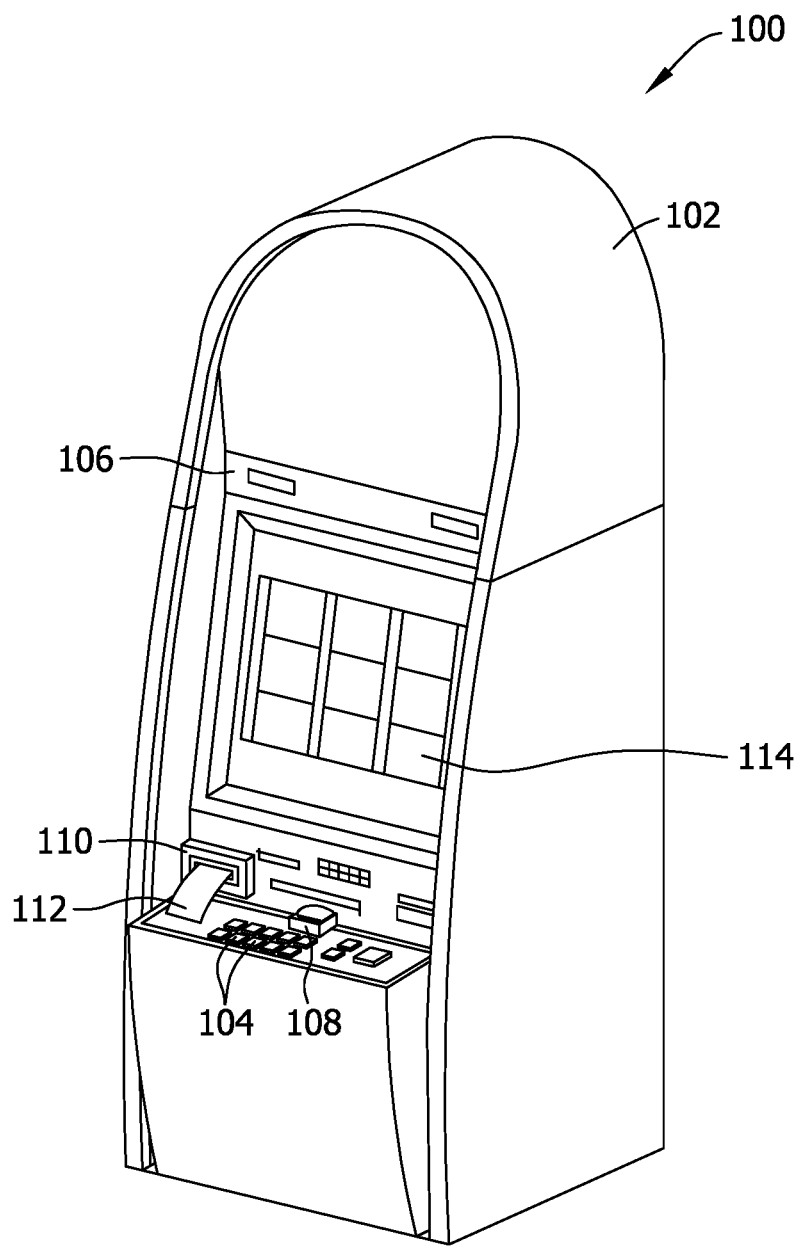
FIG. 1 is a schematic diagram of an exemplary gaming machine.

FIG. 1 is a schematic diagram of an exemplary gaming machine 100 that facilitates awarding a jackpot based on one or more configurable trigger conditions. Gaming machine 100 may be any type of gaming machine, and may include, without limitation, different structures than those shown in FIG. 1. Moreover, gaming machine 100 may employ different methods of operation than those described below.

In the exemplary embodiment, gaming machine 100 includes a cabinet 102 configured to house a plurality of components, such as a gaming machine controller, peripheral devices, presentation devices, and player interaction devices. For example, in an exemplary embodiment, gaming machine 100 includes a plurality of input devices, such as switches and/or buttons 104 that are coupled to a front 106 of cabinet 102. Buttons 104 may be used to start play of a primary or secondary game. One button 104 may be a "Bet One" button that enables the player to place a bet or to increase a bet. Another button 104 may be a "Bet Max" button that enables the player to bet a maximum permitted wager. Yet another button 104 may be a "Cash Out" button that enables the player to receive a cash payment or other suitable form of payment, such as a ticket or voucher, which corresponds to a number of remaining credits.

In the exemplary embodiment, gaming machine 100 also includes a coin acceptor 108 for accepting coins and/or tokens, and a bill acceptor 110 for accepting and/or validating cash bills, coupons, and/or ticket vouchers 112. Bill acceptor 110 may also be capable of printing tickets 112. Furthermore, in some embodiments, bill acceptor 110 includes a card reader or validator for use with credit cards, debit cards, identification cards, and/or smart cards. The cards accepted by bill acceptor 110 may include a magnetic strip and/or a preprogrammed microchip that includes a player's identification, credit totals, and any other relevant information that may be used. Moreover, in the exemplary embodiment, gaming machine 100 includes one or more presentation devices 114. Presentation devices 114 are mounted to cabinet 102, and may include a primary presentation device for displaying a primary game and a secondary presentation device for displaying a secondary or bonus game. Presentation devices 114 may include, without limitation, a plasma display, a liquid crystal display (LCD), a display based on light emitting diodes (LEDs), organic light emitting diodes (OLEDs), polymer light emitting diodes (PLEDs), and/or surface-conduction electron emitters (SEDs), a speaker, an alarm, and/or any other device capable of presenting information to a user.

In an exemplary embodiment, presentation device 114 is used to display one or more game images, symbols, and/or indicia such as a visual representation or exhibition of movement of an object such as a mechanical, virtual, or video reel, dynamic lighting, video images, and the like. In an alternative embodiment, presentation device 114 displays images and indicia using mechanical means. For example, presentation device 114 may include an electromechanical device, such as one or more rotatable reels, to display a plurality of game or other suitable images, symbols, or indicia.

In one embodiment, gaming machine 100 randomly generates game outcomes using probability data. For example, each game outcome is associated with one or more probability values that are used by gaming machine 100 to determine the game output to be displayed. Such a random calculation may be provided by a random number generator, such as a true random number generator (RNG), a pseudo-random number generator (PNG), or any other suitable randomization process.

Figure 2:
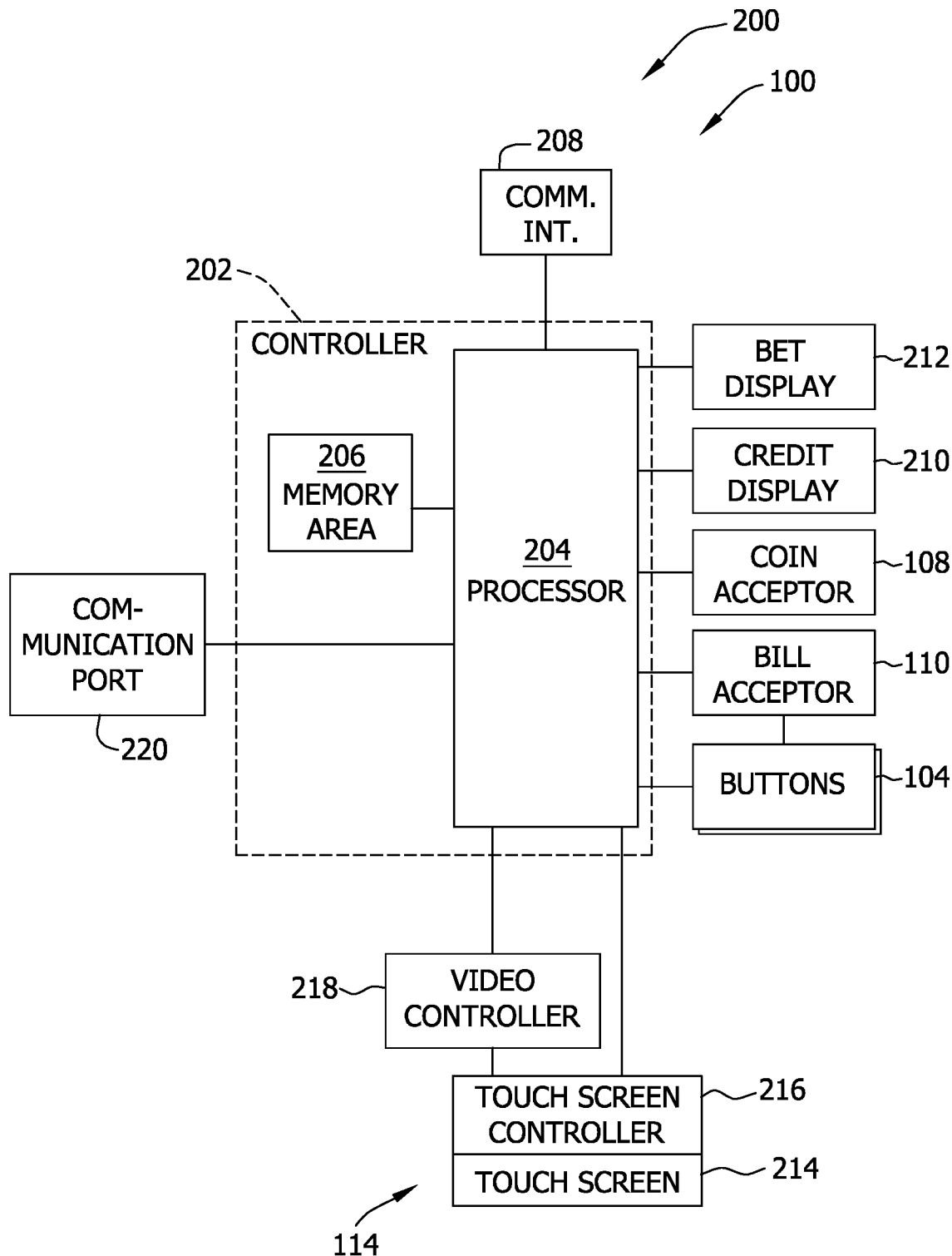
FIG. 2 is a schematic block diagram of an exemplary electrical architecture that may be used with the gaming machine shown in FIG. 1.

FIG. 2 is a schematic block diagram of an exemplary electrical architecture 200 that may be used with gaming machine 100. In the exemplary embodiment, gaming machine 100 includes a gaming machine controller 202 having a processor 204 communicatively coupled a memory area 206. Moreover, in the exemplary embodiment, processor 204 and memory area 206 reside within cabinet 102 (shown in FIG. 1) and may be collectively referred to herein as a "computer" or "controller." Gaming machine 100 is configurable and/or programmable to perform one or more operations described herein by programming processor 204. For example, processor 204 may be programmed by encoding an operation as one or more executable instructions and providing the executable instructions in memory area 206.

Controller 202 communicates with one or more other gaming machines 100 or other suitable devices via a communication interface 208. Communication interface 208 may operate as an input device (e.g., by receiving data from another device) and/or as an output device (e.g., by transmitting data to another device). Processor 204 may be a microprocessor, a microcontroller-based platform, a suitable integrated circuit, and/or one or more application-specific integrated circuits (ASICs). However, the above examples are exemplary only, and thus are not intended to limit in any way the definition and/or meaning of the term "processor."

Memory area 206 stores program code and instructions, executable by processor 204, for controlling gaming machine 100. For example, memory area 206 stores data such as image data, event data, player input data, random or pseudo-random number generation software, pay table data, trigger conditions, game play events, game play outcomes, and/or other information or applicable game rules that relate to game play on gaming machine 100. Moreover, memory area 206 may include one or more forms of memory. For example, memory area 206 can include random access memory (RAM), read-only memory (ROM), flash memory, and/or electrically erasable programmable read-only memory (EEPROM). In some embodiments, other suitable magnetic, optical, and/or semiconductor-based memory may be included in memory area 206 by itself or in combination.

In the exemplary embodiment, gaming machine 100 includes a credit display 210, which displays a player's current number of credits, cash, account balance or the equivalent. Gaming machine 100 also includes a bet display 212 which displays a player's amount wagered. Credit display 210 and bet display 212 may be standalone displays independent of presentation device 114, or credit display 210 and bet display 212 may be incorporated into presentation device 114.

Moreover, in an exemplary embodiment, presentation device 114 is controlled by controller 202. In some embodiments, presentation device 114 includes a touch screen 214 and an associated touch screen controller 216. In such embodiments, presentation device 114 may operate as an input device in addition to presenting information. A video controller 218 is communicatively coupled to controller 202 and touch screen controller 216 to enable a player to input game play decisions into gaming machine 100 via touch screen 214. Furthermore, gaming machine 100 includes one or more communication ports 220 that enable controller 202 to communicate with external peripheral devices (not shown) such as, but not limited to, external video sources, expansion buses, game or other displays, a SCSI port, or a key pad.

Figure 3:
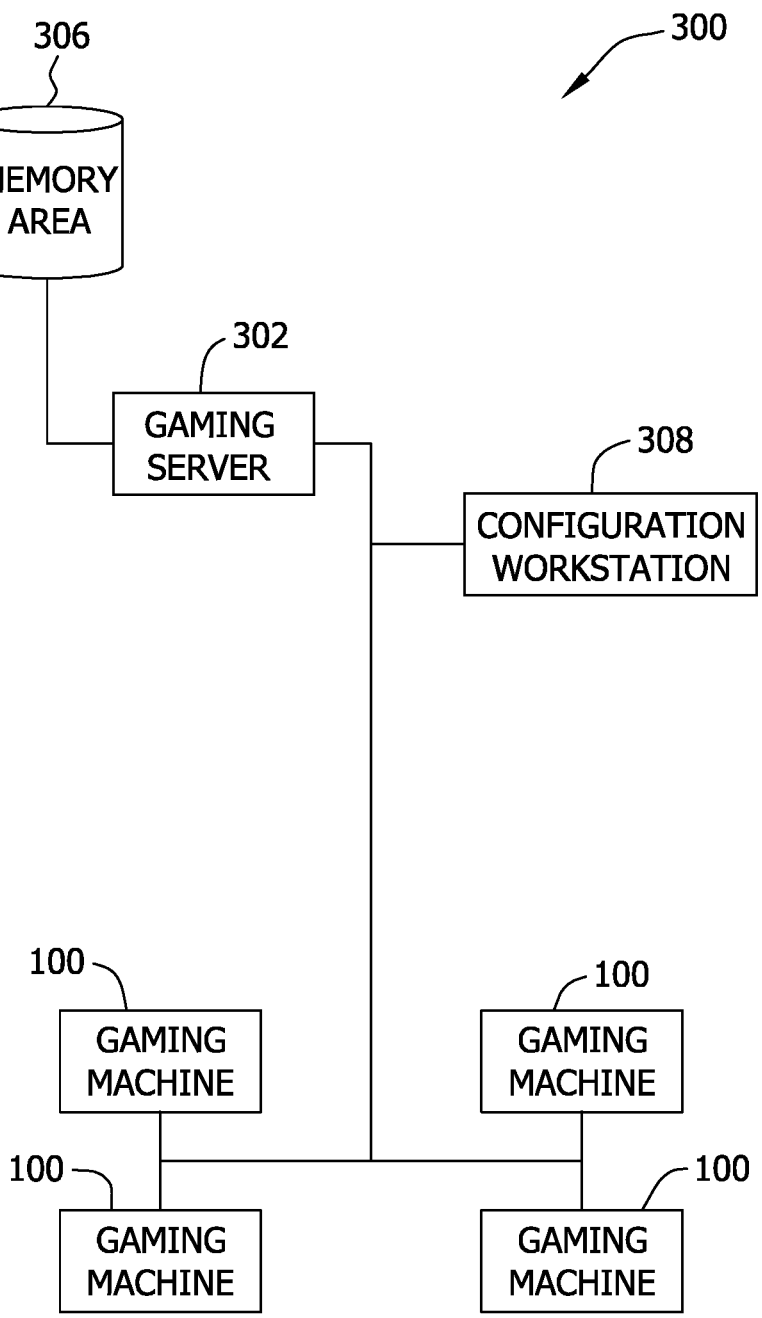
FIG. 3 is a block schematic diagram of an exemplary gaming system that includes a plurality of gaming machines shown in FIG. 1.

FIG. 3 is a block schematic diagram of an exemplary gaming system 300 that includes a plurality of gaming machines 100. Each gaming machine 100 is coupled via communication interface 208 to one or more servers, such as a gaming server 302, using a network 304. Gaming server 302 includes a processor (not shown) that facilitates data communication between each gaming machine 100 and other components of gaming system 300. Such data is stored in, for example, a memory area 306, such as a database, that is coupled to gaming server 302.

As described above, gaming machines 100 may include video bingo machines, video poker machines, video slot machines, and/or other similar gaming machines that implement alternative games. Moreover, gaming machines 100 may be terminal-based machines, wherein the actual games, including random number generation and/or outcome determination, are performed at gaming server 302. In such an embodiment, gaming machine 100 displays results of the game via presentation device 114 (shown in FIGS. 1 and 2).

Moreover, in the exemplary embodiment, gaming system 300 includes a configuration workstation 308 that includes a user interface that enables an administrator to set up and/or to modify portions of gaming system 300 and/or gaming server 302. For example, configuration workstation 308 may enable a user to define a jackpot configuration (e.g., one or more jackpot award strategies, jackpot trigger conditions, and/or sets of game tokens) and provide the jackpot configuration to gaming server 302, which operates based on the provided jackpot configuration. In addition, or alternatively, gaming server 302 may receive a jackpot configuration directly from a user.

Gaming server 302 may perform a plurality of functions including, for example, game outcome generation, player tracking functions, and/or accounting functions. However, in alternative embodiments, gaming system 300 may include a plurality of servers that separately perform these functions and/or any suitable function for use in a network-based gaming system. In some embodiments, gaming server 302 controls bonus applications or bonus systems that award bonus (e.g., base play bonuses and/or free plays) opportunities on gaming system 300. Moreover, gaming server 302 may include a set of rules for awarding jackpots in excess of those established by winning pay tables (not shown) of each gaming machine 100. Some bonus awards may be awarded randomly, while other bonus awards may be made to groups of gaming machines 100 operating in a progressive jackpot mode.

In some embodiments, gaming server 302 enables offline play at gaming machines 100. For example, game play events, associated with the player, may be executed at gaming machines 100 without communication between gaming machines 100 and gaming server 302. For example, as used herein, game play events are typically generated based on user action, such as cashing in game play tokens following a gaming session. In one embodiment, the game play events are coupons, either virtual that are transmitted to a wireless device, such as a smart phone, or physical, such as printed coupons, that are generated by gaming machine 100. Subsequently, gaming machines 100 may communicate the game play events and/or game play outcomes to gaming server 302, which awards jackpot credits and/or game play tokens (described in more detail below) based on the game play events and/or outcomes (e.g., by determining that the game play events and/or outcomes satisfy a jackpot trigger condition). Gaming server 302 may optionally be configured to not award jackpot credits and/or game play tokens based on offline play, or to award jackpot credits and/or game play tokens only for a predetermined duration after communication is re-established between an offline gaming machine 100 and gaming server 302. Accordingly, an offline player may forfeit a chance to be awarded a jackpot credit or game play token.

Moreover, in some embodiments, gaming server 302 tracks data of players using gaming machines 100, and also controls elements (e.g., messages and/or bonus modes) that appear on presentation device 114 of gaming machines 100. For example, gaming server 302 can store physical characteristics of players, such as, but not limited to, the player age. Gaming server 302 can also store data related to the players and tracked using player tracking identification, such as a player card. Moreover, gaming server 302 can store information and data about the player such as loyalty points, player address, phone number, and/or any information that may be retrieved and transmitted to gaming machines 100. In some embodiments, gaming server 302 stores and tracks information such as, but not limited to, the average amount of wager played at gaming machine 100. Moreover, gaming server 302 can track an average amount of wagers by the player, any funds the player may have in an account, and data relating to reportable events. Such data is associated with individual players and logged using a taxable accrual log.

Figure 4:
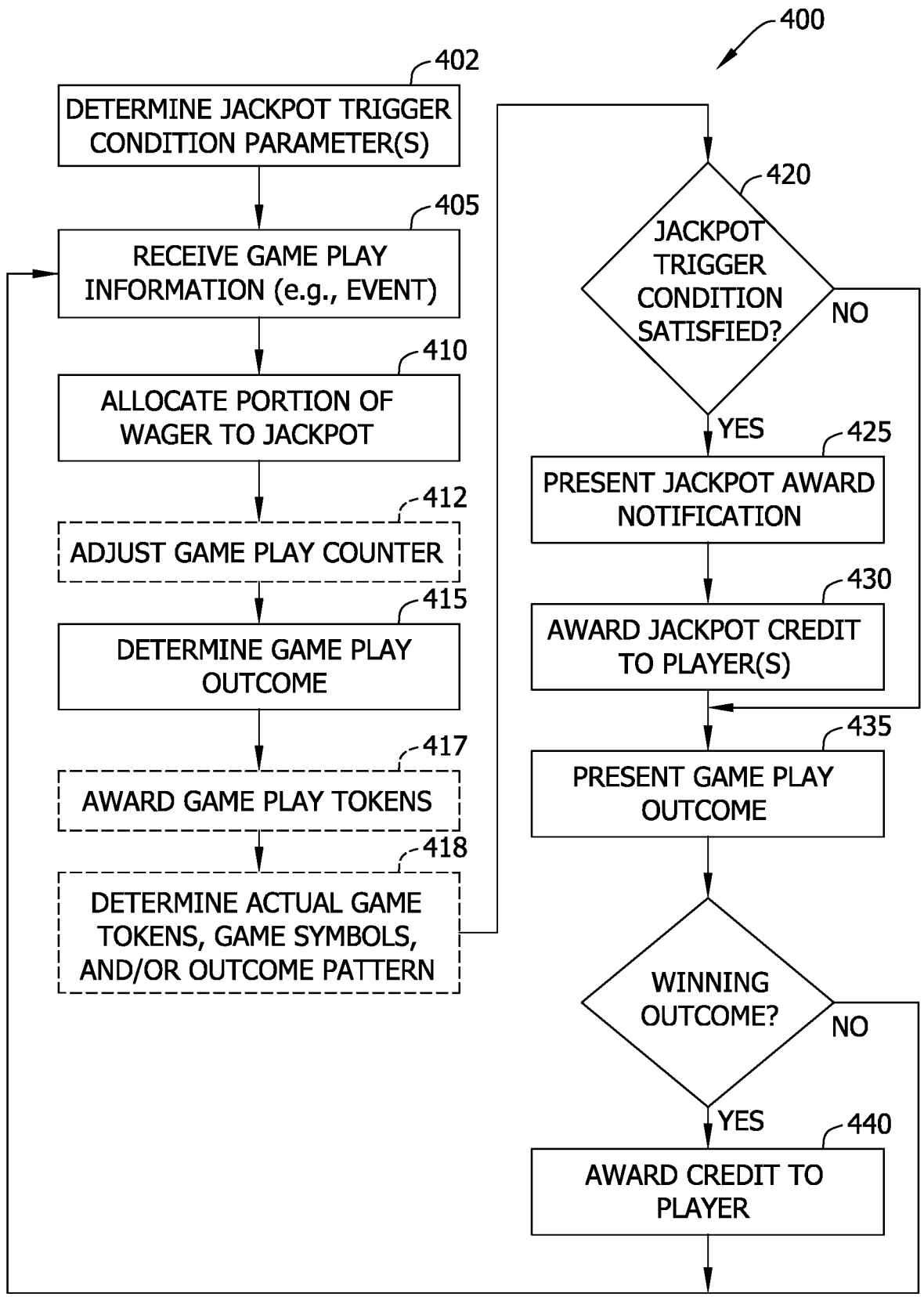
FIG. 4 is a flowchart that illustrates an exemplary method for use with the gaming system shown in FIG. 3.

FIG. 4 is a flowchart that illustrates an exemplary method 400 for use with gaming system 300 (shown in FIG. 3). Operations in method 400 may be performed by gaming machine 100, by gaming server 302, and/or by any other computing device. In exemplary embodiments, referring to FIGS. 2, 3, and 4, game play information (e.g., a game play event) associated with a player is received 405. For example, a gaming machine 100 may receive 405 the game play event via an input device (e.g., a button 104 or a touch screen 214). In addition, or alternatively, a gaming machine 100 may transmit a game play event, and gaming server 302 may receive 405 the game play event from the gaming machine 100 via a communication interface, such as communication interface 208.

In some embodiments, the game play event is associated with a wager, and a portion of the wager is allocated 410 to a jackpot. For example, a predetermined amount of currency and/or a predetermined portion (e.g., a percentage) of the wager may be allocated 410 to the jackpot.

Gaming machine 100 and/or gaming server 302 determines 415 a game play outcome based on the game play event. For example, the game play outcome may be determined 415 by randomly selecting a sequence of game symbols (e.g., reel symbols and/or playing cards) and selecting an outcome entry, if any, that is associated with the sequence of game symbols in a pay table. The game play outcome may include an amount of credit, or a "payout", to award to the player. Game play outcomes may be classified as winning and non-winning. For example, game play outcomes associated with a payout may be considered winning, and game play outcomes not associated with a payout may be considered non-winning.

In some embodiments, gaming machine 100 and/or gaming server 302 awards 417 one or more game tokens to the player based on the game played, the game play outcome, a bonus event associated with the game play, and/or a random determination of whether a game token is to be awarded 417. The game token may be selected from a predetermined set of game tokens that is associated with the operator of gaming system 300 (e.g., a casino), with a business partner (e.g., an advertiser or promoter) of the operator, with the game being played, and/or with the player. Each game token may be represented by an icon, a photograph, a name, a number, and/or any other device, or portion thereof, suitable for distinguishing one game token from other game tokens. For example, a set of game tokens may include components of a car, with one game token represented by an image of a door, another game token represented by an image of a wheel, etc.

Gaming machine and/or gaming server 302 may award 417 game tokens based on configurable rules. For example, the operator of gaming system 300 may define a game token award table, similar to a pay table, that associates combinations and/or permutations of game symbols with a game token to be awarded based on the combination and/or permutation. In addition, or alternatively, a game token may be awarded 417 based on the game being played. For example, if the operator of gaming system 300 provides five games, a different game token may be associated with each game, and the associated game token may be awarded 417 to the player the first time, or each time, a player plays each game. In some embodiments, gaming machine 100 and/or gaming server 302 awards 417 game tokens based on token award trigger conditions, which may function similarly to jackpot trigger conditions, described in more detail below.

Gaming machine 100 and/or gaming server 302 determines 420 whether one or more jackpot trigger conditions are satisfied based at least in part on the game play event. In exemplary embodiments, the jackpot trigger condition includes a target quantity of games played, a target set of game tokens, a target pattern of game symbols, and/or a target pattern of game play outcomes. Jackpot trigger conditions are described in more detail below.

If a jackpot trigger condition is satisfied, gaming machine 100 and/or gaming server 302 presents 425 a jackpot award notification (e.g., via a presentation device 114 and/or by transmitting the notification via a communication interface, such as communication interface 208). A jackpot credit is awarded 430 to the player, such as by crediting an account associated with the player. In some embodiments, a jackpot credit is awarded 430 to a player only when the player has been authenticated as being associated with an account at gaming machine 100. For example, the player may be authenticated by receiving an identification card and/or by receiving credentials (e.g., a username and/or password) associated with an account. In such embodiments, the jackpot award notification may not be presented 425 to the player, or the jackpot award notification may be presented 425 with a message inviting the player to create an account so that the player may be eligible for jackpot credits.

In exemplary embodiments, after presenting 425 and awarding 430 any jackpot credit to the player, gaming machine 100 and/or gaming server 302 presents 435 the game play outcome that was previously determined 415. If the outcome is a winning outcome, the player is awarded 440 a credit. For example the credit awarded 440 may be based on a pay table.

One or more operations in method 400 may be performed repeatedly. For example, game play events may be received 405 repeatedly, and at least a portion of the steps described above may be performed based on each game play event.

Jackpot Trigger Conditions

Embodiments described herein may be used to award jackpots based on one or more jackpot award strategies. A jackpot award strategy defines a jackpot trigger condition, which may include, for example, a target quantity of games played, a target set of game tokens, a target pattern of game symbols, and/or a target pattern of game play outcomes.

A target quantity of games played includes, for example, a quantity of games associated with one or more players and/or gaming machines 100. A target set of game tokens includes, for example, a set of individual game tokens that may be collected by a player during game play, as described below. A target pattern of game symbols includes, for example, a combination, a permutation, and/or a ratio of game symbols generated by gaming system 300 in response to a game play event. A target pattern of game play outcomes includes, for example, a combination, a permutation, and/or a ratio of outcomes (e.g., winning and/or non-winning outcomes) determined 415 based on game play events.

In exemplary embodiments, one or more jackpot trigger condition parameters are determined 402. Such parameters may include, without limitation, a target quantity of games played, a target set of game tokens, a target pattern of game symbols, and/or a target pattern of game play outcomes. Jackpot trigger condition parameters may be predetermined as static values received from a user (e.g., an operator of gaming system 300) at gaming server 302, and/or may be automatically generated. For example, a gaming machine 100 or gaming server 302 may determine 402 a target quantity of games played based at least in part on a random number. In addition, or alternatively, the gaming machine 100 or gaming server 302 may determine 402 the target quantity of games played by determining a number between a predetermined minimum value and a predetermined maximum value. The target quantity of games played may be based further on one or more game symbols associated with a game play executed by gaming machine 100 and/or gaming server 302. For example, a game symbol (e.g., a reel symbol) may be associated with a predetermined number, and that number may be used as a "seed" value in generating a random number.

Similarly, a target set of game tokens, a target pattern of game symbols, and/or a target pattern of game play outcomes may be determined at least partially randomly and, optionally, within minimum and/or maximum bounds.

In embodiments where at least one jackpot trigger condition includes a target quantity of games played, gaming machine 100 and/or gaming server 302 determines 420 whether the jackpot trigger condition is satisfied at least in part by determining whether an actual quantity of games played is greater than or equal to the target quantity of games played. In exemplary embodiments, a game play counter is adjusted 412 (e.g., incremented toward a maximum value or decremented toward a minimum value) based on each game play event, each game play, each game play that is associated with a predetermined outcome, each game play that is associated with a bonus event, and/or each game play that is associated with a wager within a predetermined wager range. As an example, if the game play counter is initially set to zero and adjusted 412 by incrementing, gaming machine 100 and/or gaming server 302 may determine 420 whether the jackpot trigger condition is satisfied by determining whether the actual quantity of games played is equal to or greater than the target quantity of games played.

In embodiments where at least one jackpot trigger condition includes a target set of game tokens, a target pattern of game symbols, and/or a target pattern of game play outcomes, gaming machine 100 and/or gaming server 302 determines 418 the actual set of game tokens awarded 417 to the player, an actual pattern of game symbols determined 415 in response to the received game play event, and/or an actual pattern of game play outcomes (e.g., winning and non-winning outcomes) determined 415 in response to a plurality of game play events. Gaming machine 100 and/or gaming server 302 may determine 418 the actual set and/or actual pattern based on game tokens awarded 417 and/or game play outcomes determined 415 during a session of game play (e.g., while a single player is using gaming machine 100), game tokens awarded 417 and/or game play outcomes determined 415 in association with a player account corresponding to the player (e.g., across one or more sessions), game tokens awarded 417 and/or game play outcomes determined 415 in association with a single gaming machine 100 (e.g., the gaming machine 100 that received 405 and/or generated the received game play event).

In such embodiments, gaming machine 100 and/or gaming server 302 determines 420 whether a jackpot trigger condition is satisfied at least in part by determining whether an actual set and/or pattern matches a corresponding target set and/or pattern. For example, if the actual set of game tokens includes all tokens in a target set of game tokens, gaming machine 100 and/or gaming server 302 may determine that a jackpot trigger condition is satisfied.

In some embodiments, multiple jackpot trigger conditions are defined. In such embodiments, gaming machine 100 and/or gaming server 302 determines 420 whether any of the jackpot trigger conditions is satisfied. If so, gaming machine 100 and/or gaming server 302 presents 425 a jackpot award notification to the player and awards 430 a jackpot credit to the player, as described above.

Group Play

Some embodiments facilitate "group play," in which a group of players to participate in a jackpot. In such embodiments, gaming system 300 includes a plurality of gaming machines 100, each of which is associated with a player. For example the gaming machines 100 may include all gaming machines 100 in a bank of interconnected machines (e.g., in a particular area of a casino), gaming machines 100 associated with players in a predetermined group or "circle of friends", and/or gaming machines 100 associated with players who elect to participate in a group jackpot.

In such embodiments, each gaming machine 100 may receive 405 a game play event from the associated player and determine 415 a game play outcome based on the game play event. Gaming server 302 receives 405 game play information (e.g., a game play event and a game play outcome) from each gaming machine 100 and determines 420 whether a jackpot trigger condition is satisfied based on the received game play information, as described in more detail below. In addition, or alternatively, gaming server 302 may receive 405 a game play event from each gaming machine 100 and determine 415 a game play outcome based on the game play event. The game play outcome may be provided to the gaming machine 100 for presentation 435 to the player and used by gaming server 302 to determine 420 whether a jackpot trigger condition is satisfied.

To determine 420 whether a jackpot trigger condition is satisfied, gaming server 302 may combine the game play information received 405 from the gaming machines 100. For example, gaming server 302 may calculate the actual quantity of games played based on the received game play information, such as by summing individual game play counters associated with the players to create a collective game play counter. In addition, or alternatively, gaming server 302 may maintain a collective game play counter that is independent of such individual game play counters and adjust 412 the collective game play counter each time a game play event is received 405 from a gaming machine 100. The collective game play counter may be compared to a target quantity of games played to determine 420 whether a jackpot trigger condition is satisfied.

Similarly, game tokens, game symbols, and/or game play outcomes associated with individual players may be combined to determine 418 actual game tokens, actual game symbols, and/or actual game play outcome patterns. Gaming server 302 may determine 420 whether a jackpot trigger condition is satisfied by comparing this combination to a corresponding target set of game tokens, target pattern of game symbols, and/or target pattern of game play outcomes.

In group play embodiments, the entire jackpot credit may be awarded 430 to a single player. As an example, the jackpot credit may be awarded to the player who is associated with the game play event, or the gaming machine 100 associated with the game play event, that caused the jackpot trigger condition to be satisfied. As another example, the jackpot credit may be awarded 430 to a player randomly selected from the group of players when the jackpot trigger condition is satisfied.

Alternatively, the jackpot credit may be split into equal or unequal portions, and the portions may be awarded 430 to a plurality of players in the group, such that the jackpot is distributed to at least a portion of the group. In some embodiments, a first portion of the jackpot credit is awarded 430 to a first player who is associated with the game play event, or the gaming machine 100 associated with the game play event, that caused the jackpot trigger condition to be satisfied. The remainder of the jackpot credit (i.e., the difference between the original jackpot credit and the first portion) is awarded 430 to the other players in the group (i.e., the players other than the first player) in equal portions.

Figure 5:
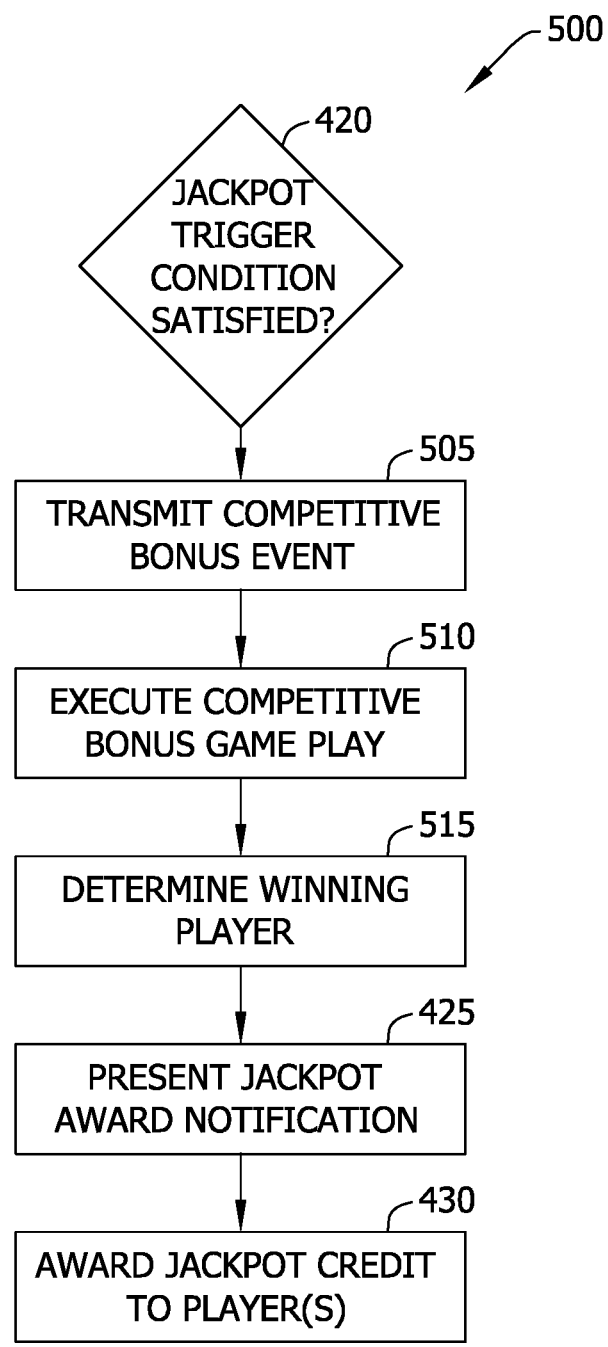
FIG. 5 is a flowchart that illustrates an exemplary method for use in awarding a jackpot credit based on competitive play.

Some embodiments determine an allocation of the jackpot credit based at least in part on competitive play between the players in the group. FIG. 5 is a flowchart that illustrates an exemplary method 500 for use in awarding 430 (shown in FIG. 4) a jackpot credit based on competitive play. In exemplary embodiments, after determining 420 that a jackpot trigger condition is satisfied, gaming server 302 transmits 505 a competitive bonus event to gaming machines 100. The competitive bonus event indicates that players associated with gaming machines 100 will compete for at least a portion of the jackpot credit.

Each gaming machine executes 510 a competitive bonus game play based on the competitive bonus event. The competitive bonus game play represents a competition among the players. For example, the competitive bonus game play may include a race, in which a game piece associated with each player is advanced along a course by inputs (e.g., button presses) by the player. As another example, the competitive bonus game play may include a quiz, in which each player scores points for answering answers correctly.

Gaming server 302 determines 515 a winning player among the players based on the competitive bonus game play executed by gaming machines 100. In the examples described above, gaming server 302 may determine 515 which player first advanced a game piece to the end of a race course, or which player first accrued a predetermined quantity of points in a quiz. Other methods of determining 515 a winning player based on the competitive bonus game play are also contemplated.

Gaming server 302 presents 425 a jackpot award notification to the winning player and any other players to whom a jackpot credit will be awarded 430. Gaming server 302 awards 430 at least a portion of the jackpot credit to the winning player. A portion of the jackpot credit may also be awarded 430 to other players in the group, such as the player who is associated with the game play event that caused the jackpot trigger condition to be satisfied and/or any other player in the group. For example, each player in the group may be awarded 430, at a minimum, a predetermined proportion (e.g., expressed as a percentage) of the jackpot credit, and a larger proportion may be awarded 430 to the player winning the competitive bonus game play and/or the player who is associated with the game play event that caused the jackpot trigger condition to be satisfied.

Some embodiment facilitate awarding 417 game play tokens and/or awarding 430 jackpot credits based on game play events and/or outcomes at a plurality of sites. For example, gaming server 302 may monitor game play events and/or outcomes at a plurality of gaming machines 100 that are located at a plurality of sites. Gaming server 302 may award 417 game play tokens and/or determine 420 whether a jackpot trigger condition is satisfied based on the monitored game play from the sites.

Embodiments provided herein facilitate awarding a jackpot to one or more players associated with a gaming system based on configurable jackpot award strategies, which define jackpot trigger conditions. In single player embodiments, a jackpot credit is awarded to the player when at least one jackpot trigger condition is satisfied. In group play embodiments, the jackpot may be awarded to the player responsible for satisfying a jackpot trigger condition, to the winner of a competitive game initiated in response to the jackpot trigger condition being satisfied, and/or any other player in the group. Such embodiments allow the operator of the gaming system to configure the jackpot award strategies to enhance the entertainment aspect of game playing.

The systems and methods described herein are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, controller, or server, such as those described herein, includes at least one processor or processing unit and a system memory. The computer, controller, or server typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary gaming system environment, embodiments of the invention are operational with numerous other general purpose or special purpose gaming system environments or configurations. The gaming system environment is not intended to suggest any limitation as to the scope of use or functionality of any aspect of the invention. Moreover, the gaming system environment should not be interpreted as having any dependency or requirement relating to any one or combination of components illustrated in the exemplary operating environment.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, PostgreSQL, and SQLite. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gaming system comprising:
   a processor; and
   a memory configured to store a game token award table, a plurality of game types, and instructions thereon, wherein the instructions, when executed by the processor, cause the processor to:
   generate a game play outcome of a first game type of the plurality of game types for a first player;
   perform a lookup within the memory of the game token award table using the game play outcome, the game token award table identifying a plurality of token award conditions;
   cause display of a set of tokens associated with the first player to be an updated set of tokens including a first token based on the lookup;
   compare the updated set of tokens with a target set of tokens, the target set of tokens including a plurality of token types including a first token type and a second token type, each token type of the plurality of token types being associated with a corresponding token award condition of the plurality of token award conditions and a game type of the plurality of game types, wherein the first token type is associated with the first game type and the second token type is associated with a second game type of the plurality of game types; and determine whether a jackpot trigger condition is satisfied based on whether the updated set of tokens associated with the first player includes each token type of the target set of tokens.

2. The gaming system of claim 1, wherein the token award condition for each token type of the plurality of token types is associated with play of a different one of the plurality of game types.

3. The gaming system of claim 2, wherein the token award condition for the first token is satisfied based on at least one of: a first play of the first game and the game play outcome of the first game.

4. The gaming system of claim 1, wherein the instructions further cause the processor to:

receive a user request to play the second game type of the plurality of game types;

determine an additional game play outcome associated for the first player during play of the second game type; and award a second token to the first player based on a lookup of the game token award table using the additional game play outcome.

5. The gaming system of claim 1, wherein each token type of the plurality of token types is associated with a unique token award condition.

6. The gaming system of claim 1, wherein the jackpot trigger condition further includes at least one of a target quantity of games played, a target quantity of winning game outcomes, a target pattern of game symbols, and a target ratio of winning game play outcomes to non-winning game play outcomes.

7. The gaming system of claim 6, wherein the instructions, when executed by the processor, further cause the processor to:

increment a game play counter based on a game play event; and determine whether the quantity of games played is equal to or greater than the target quantity of games played based at least in part on the game play counter.

8. The gaming system of claim 1, wherein the instructions, when executed by the processor, further cause the processor to determine the target set of tokens based at least in part on a random number.

9. The gaming system of claim 1, wherein the game token award table associates token award conditions with a corresponding token type.

10. The gaming system of claim 9, wherein the token award conditions include a combination of game symbols.

11. The gaming system of claim 1, wherein a first token award condition associated with the first token includes at least one of a game type played, a combination of game symbols in the game play outcome, and a bonus event associated with the game play outcome.

12. A non-transitory computer-readable media containing instructions embodied thereon which, when executed by a processor, cause the processor to:

generate a game play outcome associated with a first player identifier of a first game type of a plurality of game types;

perform a lookup of a game token award table using the game play outcome, the game token award table identifying a plurality of token award conditions;

cause display of a set of tokens associated with the first player identifier to be an updated set of tokens including a first token based on the lookup;

compare the updated set of tokens with a target set of tokens, the target set of tokens including a plurality of token types including a first token type and a second token type, each token type of the plurality of token types being associated with a corresponding token award condition of the plurality of token award conditions and a game type of the plurality of game types, wherein the first token type is associated with the first game type and the second token type is associated with a second game type of the plurality of game types; and determine whether a jackpot trigger condition is satisfied based on whether the updated set of tokens associated with the first player identifier includes each token type of the target set of tokens.

13. The non-transitory computer-readable media of claim 12, wherein the token award condition for each token type of the plurality of token types is associated with play of a different one of the plurality of game types.

14. The non-transitory computer-readable media of claim 13, wherein the token award condition for the first token is satisfied based on at least one of: a first play of the first game and the game play outcome of the first game.

15. The non-transitory computer-readable media of claim 12, wherein the instructions further cause the processor to:

receive a user request to play the second game type of the plurality of game types;

determine an additional game play outcome associated for the first player during play of the second game type; and award a second token to the first player based on a lookup of the game token award table using the additional game play outcome.

16. The non-transitory computer-readable media of claim 12, wherein each token type of the plurality of token types is associated with a unique token award condition.

17. The non-transitory computer-readable media of claim 12, wherein the jackpot trigger condition further includes at least one of a target quantity of games played, a target quantity of winning game outcomes, a target pattern of game symbols, and a target ratio of winning game play outcomes to non-winning game play outcomes.

18. A method for use with a gaming system, the method comprising:

generating a game play outcome of a first game type of a plurality of game types for a first player;

performing a lookup of a game token award table using the game play outcome, the game token award table identifying a plurality of token award conditions;

cause display of a set of tokens associated with the first player to be an updated set of tokens including a first token based on the lookup;

comparing the updated set of tokens with a target set of tokens, the target set of tokens including a plurality of token types including a first token type and a second token type, each token type of the plurality of token types being associated with a corresponding token award condition of the plurality of token award conditions and a game type of the plurality of game types, wherein the first token type is associated with the first game type and the second token type is associated with a second game type of the plurality of game types; and determining whether a jackpot trigger condition is satisfied based on whether the updated set of tokens associated with the first player includes each token type of the target set of tokens.

19. The method of claim 18 further comprising:
storing, on a memory of the gaming system, the plurality of game types;
receiving a user request to play the second game type of the plurality of game types;
determining an additional game play outcome associated for the first player during play of the second game type; and
awarding a second token to the first player based on a lookup of the game token award table using the additional game play outcome.

20. The method of claim 18, wherein the game token award table associates token award conditions with a corresponding token type, and wherein the token award conditions include a combination of game symbols.

* * * * *